United States Patent [19]
Rich

[11] Patent Number: 6,024,086
[45] Date of Patent: Feb. 15, 2000

[54] SOLAR ENERGY COLLECTOR HAVING OVAL ABSORPTION TUBES

[76] Inventor: Albert Clark Rich, 4808 Robertson Ave., Carmichael, Calif. 95608

[21] Appl. No.: 09/120,925

[22] Filed: Jul. 22, 1998

[51] Int. Cl.[7] .................. F24J 2/24; F28F 9/02; F16L 33/00; F16L 9/18
[52] U.S. Cl. .......... 126/664; 126/665; 165/174; 165/175; 165/177; 285/252; 138/111; 138/115; 29/890.043
[58] Field of Search ................ 126/664, 663, 126/665; 165/174, 48.2, 175, 177; 29/890.043, 890.044; 285/239, 124.4, 397, 39, 252; 4/499; 138/111, 115

[56] References Cited

U.S. PATENT DOCUMENTS

| | | | |
|---|---|---|---|
| 1,918,211 | 7/1933 | Olson | 165/175 |
| 2,521,475 | 9/1950 | Nickolas | 165/177 |
| 2,719,210 | 9/1955 | Chapman | 29/890.43 |
| 2,798,745 | 7/1957 | Nelson | 285/239 |
| 2,876,023 | 3/1959 | Ford | 285/239 |
| 3,045,340 | 7/1962 | Kolling | 29/890.43 |
| 3,239,000 | 3/1966 | Meagher | 126/663 |
| 3,572,999 | 3/1971 | Sato | 165/177 |
| 3,679,531 | 7/1972 | Wienand et al. | 165/177 |
| 3,750,744 | 8/1973 | Bouras | 165/175 |
| 3,758,138 | 9/1973 | Roseman | 285/124.4 |
| 4,114,597 | 9/1978 | Erb | 126/665 |
| 4,205,657 | 6/1980 | Kelly | 126/425 |
| 4,265,225 | 5/1981 | Berger et al. | 165/175 |
| 4,292,958 | 10/1981 | Lee | 165/175 |
| 4,321,911 | 3/1982 | Offutt | 126/663 |
| 4,373,514 | 2/1983 | Lois | 126/438 |
| 4,453,534 | 6/1984 | Kazimir | 126/420 |
| 4,577,352 | 3/1986 | Gautheron | 4/499 |
| 4,626,005 | 12/1986 | Stifter | 285/239 |
| 4,709,689 | 12/1987 | Simcox | 126/665 |
| 4,718,404 | 1/1988 | Sadler | 126/665 |
| 4,762,116 | 8/1988 | Vincent | 126/665 |
| 4,785,879 | 11/1988 | Longsworth et al. | 165/177 |
| 4,823,771 | 4/1989 | Menning | 126/448 |
| 4,867,133 | 9/1989 | Sadler | 126/663 |
| 4,898,153 | 2/1990 | Sherwood | 126/665 |
| 4,930,492 | 6/1990 | Rich | 126/420 |
| 5,105,877 | 4/1992 | Ando | 29/890.043 |
| 5,143,052 | 9/1992 | Case | 126/415 |
| 5,186,250 | 2/1993 | Ouchi et al. | 165/177 |
| 5,251,692 | 10/1993 | Haussmann | 165/177 |
| 5,275,148 | 1/1994 | Ranyak | 126/665 |
| 5,407,004 | 4/1995 | DeRisi et al. | 29/890.43 |
| 5,572,988 | 11/1996 | Walton | 126/652 |

FOREIGN PATENT DOCUMENTS

| | | | |
|---|---|---|---|
| 801627 | 8/1936 | France | 126/664 |
| 3524509 A1 | 1/1987 | Germany | 126/665 |

*Primary Examiner*—Ira S. Lazarus
*Assistant Examiner*—David Lee
*Attorney, Agent, or Firm*—Leland K. Jordan

[57] ABSTRACT

A flexible solar absorbing means, which can be one or more extruded or molded plastic or rubber oval tubes which may or may not be connected to each other at the edges by a small webbing; communicating with a rounding connection adapter means communicating with a distribution and collecting header means which can be connected as separate parts or molded as a unit; communicating with the remainder of the solar systems, mounting, piping, pumping, control and storage means as well as frame and glazing means where appropriate.

8 Claims, 2 Drawing Sheets

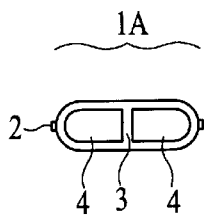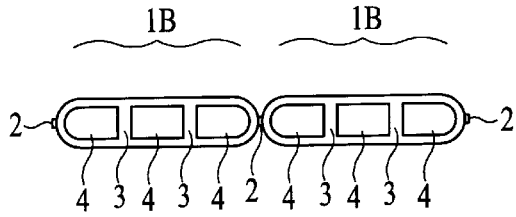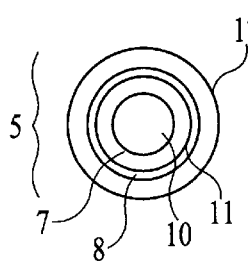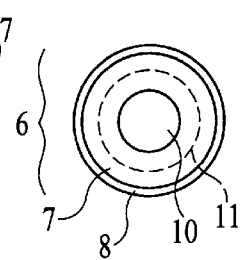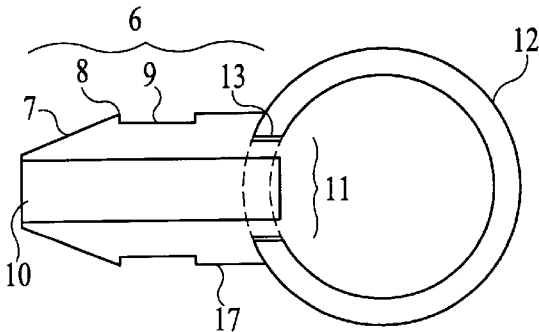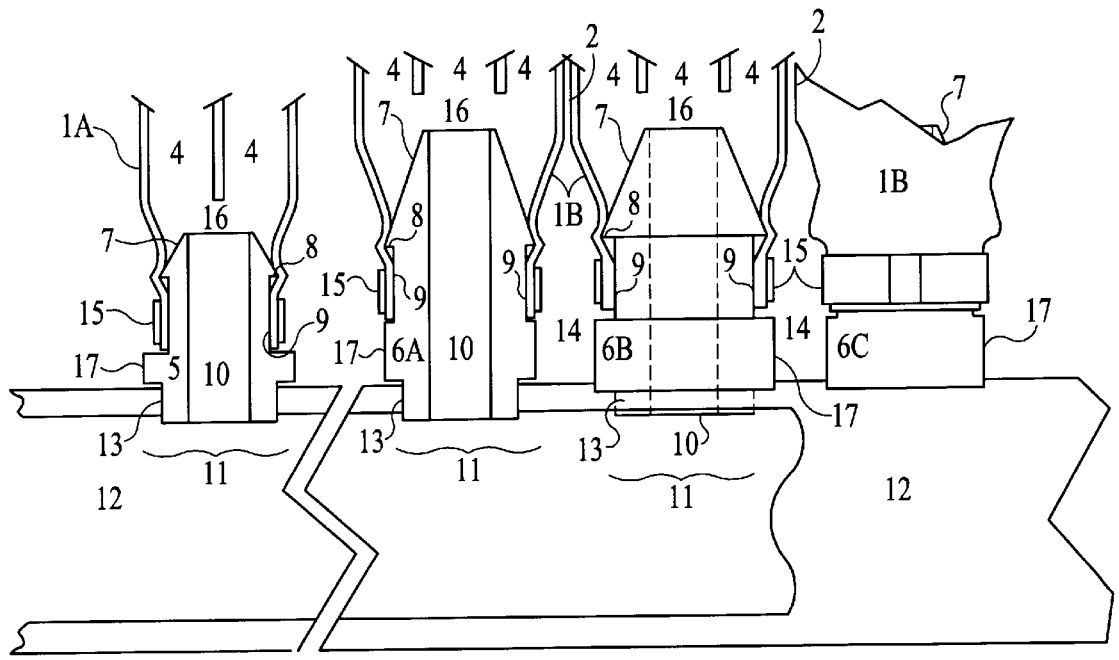

SOLAR ENERGY COLLECTOR HAVING OVAL ABSORPTION TUBES

BACKGROUND OF THE INVENTION

1. Field of the Invention

The present invention relates to an improved solar thermal collector absorber and distribution means which allows for higher performance, greater design flexibility, easy repair, reduced shipping costs and easy assembly of the system for greater cost effectiveness and practical application by the user for pool, spa, domestic, commercial, institutional, farm and other water heating applications.

2. Description of the Prior Art

The solar pool water heating market, which is the most immediate application of the invention, is a proven and very stable market with millions of dollars in sales annually, this superior product will have an immediate and large market available for distribution of its technically and economically superior product. The purpose of this product is to make the highest performance solar pool heating product available using a large "wetted area" format while eliminating the major problems associated with the use of that format by other manufacturers.

The highest performance rated solar pool heating product on the market today is an EPDM individual tube mat with a rating of 1,027 BTU's per square-foot per day. This is done with a series of eighteen 5/16" individual tubes making a 6" wide mat strip. These eighteen tubes are then pressed over eighteen tiny and very fragile plastic nipples in a 13.25" long header. Serious problems exist in this design in that the nipples break easily and when in operation can clog easily. In addition the EPDM tube is adhered to the plastic nipple with a powerful and very nasty to use semi-instant glue which is very unpleasant, very messy and toxic to use. The header is prone to failure as the headers have failed due to the ABS glue continuing to eat through the plastic socket. It this happens or worse yet, a leak is found on assembly, the entire series of sections needs to be cut out and completely redone. In short this system is the ultimate in an "unforgiving" design and begs for the improvements set forth in the invention.

Another product, SolaRoll™ and other similar products use a 4 to 6 tube design that suffers from lower performance because they have a large amount of solar surface area occupied by poor energy conducting rubber webbing between the active solar collecting tubes.

Other pool heating products such as the Faico, Solar Industries or other similar products are single piece units which are large and require many holes or expensive mounting racks to be secured to the roof as well as a roof space that is uninterrupted by valleys, sewer pipes, vents and so on whereas the invention can easily go over or around such obstacles and can be installed with no roof penetrations or mounting racks. Most current systems require expensive shipment by truck whereby the invention can easily be shipped by low cost parcel service (like UPS) and assembled by one or more people on site.

The truly great difference is in the clever design which makes the systems flexibility particularly "user friendly" and the embodiments allowing for this user friendliness is what this patent seeks to protect. This design is the results of years of intensive work in the solar water heating field and solves crucial design problems. This invention overcomes the weaknesses of other product design problems in an elegant, manner which allows for greater performance due to larger or multiple water channels per tube, ease of installation, repair, and much greater overall flexibility.

SUMMARY OF THE INVENTION

The objects and advantages of the invention will be set forth in art in the description which follows and in part will be obvious from the description, or may be learned by practice of the invention. Additional objects and advantages of the invention may be realized and attained by means of the instrumentalities and combinations particularly pointed out in the specifications and appended claims. To achieve the forgoing objects and in accordance with the purpose of the invention, as embodied and broadly described herein, there is disclosed a solar thermal collector absorbing means comprising:

A flexible solar collector absorber system using extruded or formed rubber, or extruded or formed plastic in a large "wetted" area format whereby, instead of using the typical circular tube solar absorber configuration, an oval design, with or without supporting internal webbing, is used whereby, if included, said internal webbing is able to be cut out, with or without a web cutting tool, and the oval tube solar absorber material easily squeezed over a specially designed round receptacle adapter that is attached to or formed into a distribution and collecting header with said oval absorber mat material being secured to round receptacle adapter by friction, and/or mechanical attachment means; a solar absorber means that allows an increased surface area that is exposed to the sun to be in contact with internal water channels allowing for a greater transfer of solar radiant energy due to the increased exposure of internal linear water surface area interrupted by fewer tube walls and being secured to the roof or other attaching surface by adhesive or mechanical means and where oval collector absorber tubes may be molded in singular or multiple tubes to any width capable of being extruded or molded in manufacture whereby when molded as more than one oval tube the oval tubes can be manufactured with a small connecting web between said oval tubes allowing for easy separation in the installation process to facilitate connection of the reduced circumference oval tubes to the round distribution and collecting header adapters.

The advantages of the invention include but are not limited to the unique large "wetted" area of the absorber means as well as the ease by which the absorber means can be connected to the distribution and collecting header means, the flexibility of the system which lends itself to be easily adapted to a wide variety of installations which are inappropriate for many competing products, as well as the ease and low cost of shipment, ease of assembly and installation and the resulting reduction of labor costs.

The reduced circumference of the oval tube mat design allows for a continuous surface area that when squeezed onto the adapters allows for space between the adapters which is important to reliability and the ease of installation. The reduced circumference of the oval shape also reduces the volume and associated weight of fluid inherent with a single large tube as well as the potential for the necessary stretching over the adapter flange necessary to eliminate leaks.

The use of the system includes, but is not limited to; heating water for domestic or commercial pool and spa use, heating water for domestic or commercial space heating or air conditioning, heating water for fish tanks or green house or other agricultural or livestock or sanitation needs at any location with adequate solar insolation (the amount of available sunlight a particular location) in the world.

BRIEF DESCRIPTION OF THE DRAWINGS

FIG. 1 is an end view of a single tube of the oval mat tube showing a construction embodying one web support per oval tube in the design of the present invention.

FIG. 2 is an end view of two tubes of the oval mat tube showing a construction embodying two web supports per oval mat tube in the design of the present invention and the connecting tear point between the oval tubes.

FIG. 3 is an end view of a distribution and collecting header round receptacle adapter made for a smaller flexible oval mat tube, in this view shown with one internal support web which would be cut out to allow the oval tube to be squeezed over and attached to the adapter.

FIG. 4 is an end view of a distribution and collecting header round receptacle adapter made for a larger flexible oval mat tube, in this view shown with two internal support webs which would be cut out to allow the oval tube to be squeezed over and attached to the adapter.

FIG. 5 is a sectional side view showing the design details of the adapter 6 as it connects to the solar systems distribution and collecting header. The side view of FIG. 3 would be substantially the same but smaller.

FIG. 6 is a sectional top view showing the smaller flexible oval tube mat squeezed over and connecting to the distribution and collecting header round receptacle adapter which in turn connects to the distribution and collecting header.

FIG. 7 is a sectional top view showing various constructions of three of the larger flexible oval tube mats shown squeezed over and connecting to the distribution and collecting header round receptacle adapters which in turn connect to the distribution and collecting header.

DRAWING NUMBERED CODE SCHEDULE

Figure 8:
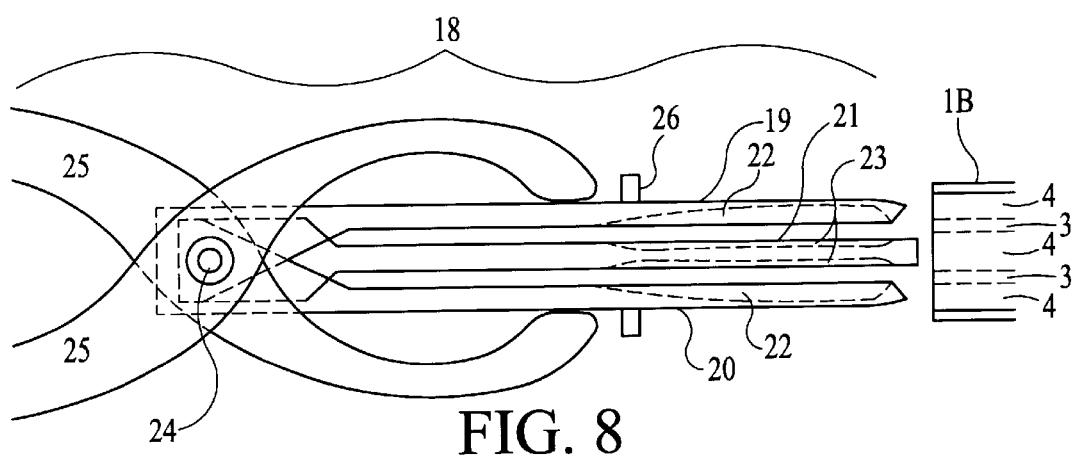
FIG. 8 is a side view of a tool designed to quickly cut out the two internal support webs in oval tube mat so it may cleanly be squeezed over 6.

1A A single tube part of a two channel oval mat tube

1B A single tube part of a three channel oval mat tube

2 Small connecting web between oval tubes parts

3 Supporting internal webbing which may or may not be used in the oval tube part.

4 Fluid channel in the oval tube part.

5 A distribution and collecting header round receptacle adapter part for a smaller oval mat tube part.

6 A distribution and collecting header round receptacle adapter for a larger oval mat tube normally for two to three channels.

7 The slopped surface area of 5 or 6 allowing for 1A or 1B to be squeezed and slipped onto the mounting surface of 5 or 6.

8 Securing tab on 5 or 6 designed to prevent 1A or 1B from slipping off 5 or 6.

9 Surface for securing 1A or 1B to 5 or 6.

10 Fluid channel in the center of 5 or 6 which serves to collect fluid from or to channels in 1A or 1B.

11 The diameter of hole required to insert 5 or 6 into distribution and collecting header.

12 Fluid distribution and collecting header.

13 Securing surface area of 5 or 6 used to attach 5 or 6 to 12.

14 Area between 5 or 6 after attachment thereof to 12.

15 Securing ring, when used, to prevent 1A or 1B from slipping off 5 or 6 over 8.

16 Fluid collecting area for channels) from 1A or 1B into 5 or 6.

17 Ridge area between 9 and 13.

18 Tool used to remove web 3 from 1A or 1B.

19 First of 2 blades in tool 18 used to remove first web 3 from 1B.

20 Blade cutting surface for blades 19 and 21.

21 Second of two blades in tool 18 used to remove web 3 from 1A or 1B.

22 Hollow in 19 and 21 to allow for two blade cutting surfaces and space for the 3 to go into when cut.

23 Hollow in 21 allowing space for the 3 to go into when cut.

24 Securing bolt or rivet holding Handles 25, and parts 19, 20 and 21 together in position.

25 Handle parts used for leverage to squeeze blades 19 and 20 onto blade cutting surface 21.

26 Insertion stop for tool 18 into 1B.

DESCRIPTION OF THE PREFERRED EMBODIMENTS

Reference will now be made in detail to a preferred embodiment of the invention, an example of which is illustrated in the accompanying drawings. Wherever possible the same reference numbers will be used throughout the drawings to refer to the same or like parts.

Referring to FIG. 1, a single oval tube mat 1A, of the present invention is shown with two fluid channels 4, and one supporting web 3, as well as the small connecting web 2, that would connect to adjacent oval tube mats. Oval tube mat 1A, can also be made without a supporting web 3, depending on the stiffness of the material it is being made of and of the pressures it will be exposed to, and therefore with only one fluid channel 4. Oval tube mat 1A, can be molded or extruded to any length and formed in many variations and sizes of the present invention the preferred embodiment being approximately one inch wide and three eighths of an inch in height and extruded as six tubes at once. Various external surface textures may be added to increase surface area and adhesion should 1A, be glued to a mounting surface.

Referring to FIG. 2, two oval tube mats 1B, of the present invention are shown connected with a small connecting web 2, with three fluid channels 4, and two supporting webs 3. Two to six or more oval tube mats 1B, could be molded or extruded together and connected with connecting web 2 to make a wider and more substantial mat. Oval tube mats 1B, could also be made with fewer or more supporting webs 3, depending on the stiffness of the material it is being made of and of the pressures it will be exposed to. Oval tube mats 1B, can be molded or extruded to any length and formed in many variations and sizes of the present invention the preferred embodiment being approximately one and three eighths inches wide and three eighths of an inch in height and extruded as six tubes at once. Various external surface textures may be added to increase surface area and adhesion should two oval tube mats 1B, be glued to a mounting surface.

The oval tube mats shown in FIG. 1 (1A) and FIG. 2 (1B) must always be made out of a material compatible with long life when exposed to the sun and flexible enough to slip over the distribution and collecting header round receptacle adapters as shown in FIG. 3 and FIG. 4. One such material is known as "EPDM" rubber and would be used in the preferred embodiment.

Referring to FIG. 3, an end view of a distribution and collecting header round receptacle adapter 5, is illustrated showing the relationship of the fluid channel 10, to the slopped surface 7, used for rounding and slipping oval mat tube 1A over securing tab 8, and header 12, hole diameter 11.

Referring to FIG. 4, an end view of a larger distribution and collecting header round receptacle adapter 6, is illustrated showing the relationship of the fluid channel 10, to the slopped surface 7, used for rounding and slipping 1A over securing tab 8, and header 12, hole diameter 11.

Referring to FIG. 5, a side sectional view of a larger distribution and collecting header round receptacle adapter 6, is illustrated showing the relationship of the fluid channel 10, to the sloped surface 7, used for rounding and slipping 1A or 1B over securing tab 8, onto lowered surface 9, and stopping at raised surface 17, which in turn ends at securing surface 13 which reduces in size to hole diameter 11, which extends into drilled out header 12. Securing surface 13, and hole diameter 11, would be eliminated if collecting header round receptacle adapter 6 and header 12 are molded or otherwise constructed in one piece.

Referring to FIG. 6, Oval tube mat 1A, is shown secured to distribution and collecting header round receptacle adapter 5, which in turn is attached by glue or other means on mounting surface 13, through hole 11, to header 12. Adapter 5, may also be molded or otherwise made in one piece eliminating the need for securing surface 13, and hole 11. A sectional view with adapter 5 shows oval tube mat 1A, slid over securing tab 8 to raised ridge 17, and secured to lowered mounting surface 9 and further held in place with securing ring 15, which may not necessarily be used. Fluid channel 10, is shown in its position to collect or distribute fluid from channels 4, in 1A, through area 16 into 10, and then into fluid collecting and distribution header 12.

Referring to FIG. 7, Three oval tube mats 1B, are shown in three top views secured to distribution and larger collecting header round receptacle adapters 6, which in turn are attached by glue or other means on mounting surfaces 13, through holes 11, to header 12. Adapters 6, may also be molded or otherwise made in one piece eliminating the need for securing surface 13, and hole 11. A sectional view with larger adapter 6A shows oval tube mat 1B, slid over securing tab 8 to raised ridge stop 17, and secured to lowered mounting surface 9 and further held in place with securing ring 15, which may not necessarily be used. Fluid channel 10, is shown in its position to collect or distribute fluid from channels 4, in 1B, through area 16 into 10, and then into fluid collecting and distribution header 12.

The flexible solar collector absorber system is comprised of an absorbing oval mat 1A or 1B, which fits over and is secured to distribution and collecting header round receptacle adapter 5 or 6. This adapter serves two functions. Function one is to distribute fluid caused by a pump or convection to flow from a heat storage vessel such as a pool or water heater, through a distribution header 12, and thus through fluid channel 10, into said oval absorber mat 1A or 1B, where said oval absorber mat may be any length, generally up to 120 feet in length, and by being exposed to the sun said mat absorbs solar heat energy through its wall where said heat is transferred to fluid channel(s) 4 by conduction. Function two is to collect the fluid thus heated in function one and thus flowing out of 1A or 1B, and into fluid channel 10, and thus into a second header 12, for the collection of heated fluid where said fluid will then be transferred to its end use such as a pool or water heater.

Figure 9:
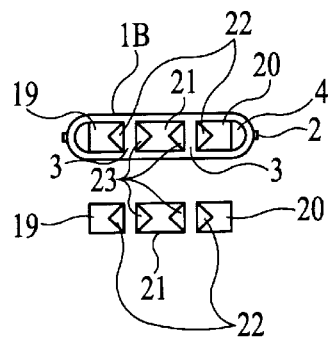
FIG. 9 is an end view of the tool shown in FIG. 8 illustrating cutting tool blades inserted into it prior to the cutting process and also showing the cutting blades by themselves.

Referring to FIG. 8, a cutting tool 18, designed to cut out webs 3, in oval tube mat 1B, is shown. A tool used to cut out web 3, in oval tube mat 1A would be similar but with one cutting blade 19 or 20. Said tool 18, having blades 19 and 20 as well as cutting surface 21 held in place by a securing bolt or rivet 24, is used by inserting blades 19 and 20, and blade cutting surface 21, into channels 4, in oval tube mat 1B, until stopped by insertion stop 26. The handles 25, are then squeezed together forcing blades 19 and 20, down onto blade cutting surface 21, and thus cutting out webs 3. Cut webs 3, are then forced into hollow 22 in cutting blades 19 and 20, as well as hollow 23, in blade cutting surface 21, where said cut webs 3, are then pulled out when tool 18 is removed from oval tube mat 1B. Upon opening handles 25 cut web 3, falls out and tool is ready to use again Referring to FIG. 9, a front sectional view of cutting tools 18, blades 19 and 20 as well as cutting surface 20 is shown in detail as inserted in the oval tube mat 1 B (top), and on its own, bottom. FIG. 9 top view shows cutting blades 19 and 20, with hollows 22, aligned over webs 3, in channels 4, ready to be used to cut web 3, into hollows 22 and 23. The bottom view shows a front sectional view of blades 19 and 20, and cutting surface 20, with hollows 22 and 23, of cutting tool 18, by themselves. Tool 18, is designed to quickly cut out the two internal support webs 3 in oval tube mat 1B so that 1B may be squeezed over distribution and collecting header round receptacle adapter 6. The cutting tool for 1A, if a web is used, would be a variation of this tool.

Examples of this invention include, but are not limited to, the following:

A flexible solar collector absorber distribution and collection system means as shown in FIGS. 6 and 7 used to heat pool or spa water pumped directly from the pool, using the existing or an auxiliary pump, with said pool or spa water being pumped through the system when solar energy is available or at night to nocturnally cool the pool, using any of, or any combination of the following; a timer, manually operated valve, automatic valve, check valves or other control device and secured to a supporting structure or roof using an adhesive material or mechanical means including, but not limited to, plastic or aluminum support rails designed to clip over the edges of oval tube mat means, various forms of straps, header couplers and unions, and collector rack designs.

A flexible solar collector absorber distribution and collection system means as shown in FIGS. 6 and 7 with or with out a collector frame and glazing means, used in any method to indirectly heat domestic water through the use of a passive or active heat exchanger loop and using an active, pumped, collector loop using water, food grade glycol or other fluid pumped through the system when solar energy is available using any of, or any combination of the following; a motorized pump, an electronic pump driver, a timer, automatic valve, check valves, photovoltaic power or other flow and/or control devices.

A flexible solar collector absorber distribution and collection system means as shown in FIGS. 6 and 7 with or with out a collector frame and glazing means, used in any method to direct or indirectly heat domestic water through the use of a passive, thermosyphon loop or loops.

A flexible solar collector absorber system comprised of an absorbing oval mat 1A or 1B, which fits over and is secured to distribution and collecting header round receptacle adapter 5 or 6 the adapter serving two functions, function one being to distribute fluid caused by a pump or convection to flow from a heat storage vessel, such as a pool or water heater, through a distribution header 12, and thus through a fluid channel 10, into said oval absorber mat 1A or 1B, where said oval absorber mat may be any length, generally up to 120 feet, in length and by being exposed to the sun said mat absorbs solar heat energy through its wall where said heat is transferred to fluid channel(s) 4 by conduction Function two is to collect the fluid thus heated in function one and thus flowing out of 1A or 1B, and into fluid channel 10, and thus into a second header 12, for the collection of heated fluid where said fluid will then be transferred to its end use such as a pool, water heater or any other item or use where heated water is needed or is desirable.

A flexible solar collector absorber distribution and collection system means as shown in FIGS. 6 and 7 used in any method in use with an "open loop" pressurized typical configuration including mist vent, isolation, and drain valves and pressure relief valve or a "closed loop" low or no pressure typical configuration including heat exchanger, charging valves, mist vent and pressure relief valve using a nontoxic antifreeze or other freeze-proof fluid using a low powered AC or DC motorized or driver powered pump which may or may not be photovoltaic powered.

It will be apparent to those skilled in the art that various modifications and variations can be made in the flexible solar collector absorber system design of the present invention and in constructing this flexible solar collector absorber system without departing from the scope or the spirit of the present invention.

Other embodiments of the invention will be apparent to those skilled in the art from consideration of the specification and practice of the invention disclosed herein. It is intended that the specification and examples be considered exemplary only, with a true scope and spirit of the invention being indicated by the following claims.

What is claimed is:

1. A solar energy absorbing system suitable for converting solar energy into thermal energy, the system comprising:

a distribution header having a first plurality of round connection adapters mounted thereto;

a collecting header having a second plurality of round connection adapters mounted thereto; and, at least one tube comprising a plurality of open channels each channel having a first end and a second end, the first end disposed over a distribution header adapter and the second end disposed over a collection header adapter, wherein said at least one tube is oval-shaped so that an increased surface area is exposed to sunlight allowing for a greater absorption of solar energy, and wherein said at least one tube has an internal support web lengthwise separating said channels, a portion of the internal support web at the first and second ends being removed to allow the oval-shaped tube to be squeezed over and attached to the round adapters.

2. The solar energy absorbing system of claim 1 wherein the oval-shaped tubes are attached at their sides to form a mat.

3. The solar energy absorbing system of claim 2 wherein the mat is formed of EDPM rubber.

4. The solar energy absorbing system of claim 1 wherein the connecting adapters comprise a tab, a sloped surface for rounding and slipping the tube over the tab, and a raised ridge surface which acts as a stop for the tube.

5. A method for assembly of a solar energy absorbing system suitable for converting solar energy into thermal energy, the method comprising:

providing a distribution header having a plurality of distribution header adapters mounted thereto;

providing a collecting header having a plurality of collecting header adapters mounted thereto; and, attaching at least one tube comprising a plurality of open channels each channel having a first end and a second end, the first end disposed over one of the distribution header adapters and the second end disposed over one of the collection header adapters, wherein said at least one tube is oval-shaped so that an increased surface area is exposed to sunlight allowing for a greater absorption of solar energy, and wherein said at least one tube has an internal support web lengthwise separating said channels, a portion of the internal support web at the first and second ends being removed to allow the oval-shaped tube to be squeezed over and attached to the round adapters.

6. The method for assembly of a solar energy absorbing system of claim 5 wherein the oval-shaped tubes are attached at their sides to form a mat.

7. The method for assembly of a solar energy absorbing system of claim 6 wherein the mat is formed of EDPM rubber.

8. The method for assembly of a solar energy absorbing system of claim 5 wherein the connecting adapters comprise a tab, a sloped surface for rounding and slipping the tube over the tab, and a raised ridge surface which acts as a stop for the tube.

* * * * *